3,351,570
STABILIZATION OF RUBBER ARTICLES BY TREATMENT WITH INORGANIC PEROXYGENATED COMPOUNDS
Bruce Kenneth Rodaway, Erdington, Birmingham, and Kenneth Osborne Calvert, Sutton Coldfield, England, assignors to Dunlop Rubber Company Limited, London, England, a British company
No Drawing. Filed Dec. 17, 1964, Ser. No. 419,181
Claims priority, application Great Britain, Jan. 17, 1964, 2,097/64
12 Claims. (Cl. 260—2.5)

ABSTRACT OF THE DISCLOSURE

A method of avoiding the staining of light colored rubber articles due to the presence of dithiocarbamates which comprises oxidizing the dithiocarbamate with a solution of hydrogen peroxide or an alkali metal perborate or persulphate. The treatment may be carried out either on the cured article or on the latex from which such an article is to be prepared, although, in the latter case, a dithiocarbamate should not be used in subsequent compounding of the latex.

---

This invention relates to improvements in the manufacture of rubber articles and more particularly in the manufacture of foam rubber articles.

White or light-colored rubber articles, particularly those produced from latices, have often had the disadvantage of being readily discoloured when handled or when forming part of an article of apparel which is worn in contact with or fairly close to the body. Such discoloration and staining has been noticed especially in light-coloured foam rubber obtained from natural rubber latices or latex blends containing synthetic rubber latices, which discoloration and staining is not easily avoidable by changes in composition formulation when a synthetic ruber latex is present.

It is known that the use of dithiocarbamate and related compounds as curatives for latex rubber articles renders such articles liable to staining in the presence of small traces of copper due to the formation of coloured copper complexes. Since the human body liberates traces of copper in perspiration, latex articles cured with the above compounds are liable to be stained, particularly on handling when damp, or on more prolonged contact with the human body.

The object of this invention is to avoid or to minimise such staining.

According to the present invention a method for the manufacture of light-coloured shaped rubber articles, particularly foam rubber articles, comprises a treatment with a dilute aqueous solution of a peroxygenated compound as oxidising agent.

In one form of the invention the cured article is treated with the dilute solution of the oxidising agent. This treatment is most suitable when the thickness of the polymer in the article is small preferably not greater than 0.02 inch, and particularly for articles which are in the form of foam, film or thread. In the case of foam articles the limiting thickness refers to the cell walls of the foam.

In an alternative procedure in accocordance with the invention and particularly when articles are made from a synthetic latex, the synthetic latex itself, which usually contains residual dithiocarbamate from the polymerization process, can be treated with the dilute solution of oxidising agent. It is then important that dithiocarbamate accelerators should not be employed to vulcanize articles produced from the latex. This treatment procedure is the more suitably for thicker, more massive, articles for which the treatment of the cured product may not be adequate.

Suitable peroxygenated compounds are hydrogen peroxide and the alkali metal salts of peracids such as the perborates and the persulphates. Hydrogen peroxide is the preferred oxidising agent.

Treatment of a cured foam rubber article with an oxidising agent can conveniently take place by immersing the article in a solution of the oxidising agent. When hydrogen peroxide is used as the oxidising agent a solution of up to 3 percent or more by weight, but preferably of 1 to 2 percent by weight, of the hydrogen peroxide in water, and preferably made alkaline with ammonia to a pH value of about 10.5, can be used. The duration of immersion can vary from a few seconds to ten minutes or more without any deleterious effects on the rubber. For the treatment of for example a continuous vulcanized foam rubber sheet, preferably after a washing followed by the removal of most of the water, the sheet can be led through a bath of a solution of an oxidising agent such as a 1 to 2 percent hydrogen peroxide solution in water, containing ammonia, and then through rollers to remove excess of the aqueous solution. The duration of treatment with the peroxide solution or solution of other oxidising agent can be increased by passing the sheet round a series of rollers and/or by reducing the speed of travel of the foam sheet. The duration of treatment can be reduced by compressing the foam at the entrance to or inside the bath to remove the air occluded in the foam, followed in the bath by removal of the compression, this measure ensuring immediate penetration of the oxidising fluid into the foam cells.

Although this treatment with hydrogen peroxide or other oxidising agent can be effective for the substantial prevention of staining in all types of white or light-coloured rubbers it is of particular value for white and light-coloured foam rubber sheets of a thickness up to about 5 mm. for use in articles of apparel.

It has been found that, generally speaking, a rubber composition which is resistant to staining in use, including contact with the skin, is also resistant to staining in the presence of a minute amount of a solution of a copper salt and that resistance to such a test in a dilute solution of a copper salt is a good measure of the resistance of the article to staining.

A suitable solution for carrying out this test is one containing 2 parts of copper (as $Cu^{++}$ ions) per million in $N/50$ sodium oleate, made alkaline to a pH value of 10.5, the copper being preferably present as copper sulphate.

It is generally recognised that the presence of a dithiocarbamate in a rubber composition will lead to the undesirable staining described herein, and the yellowish brown staining experienced in the copper staining test is that of a copper dithiocarbamate therein produced.

A dithiocarbamate is usually employed in the production of butadiene-styrene and other synthetic latices and the process of the present invention can be applied directly to such latices and then the treated latices can be compounded using rubber accelerators other than dithiocarbamates in the vulcanization of the latex composition. A suitable accelerator is a mercapto-benzthiazole, such as zinc mercapto-benzthiazole; polythioamines such as dithiodimorpholine (dimorpholine disulphide) as described in patent specification No. 929,584 can also be used.

The synthetic latex or synthetic latex blend can first be treated with the dilute oxidising agent such as hydrogen peroxide to oxidise any dithiocarbamate present. Since excess hydrogen peroxide retards the rate of cure it is desirable that the correct amount of oxidising agent only is used. This amount of oxidising agent can be determined conveniently by means of titration of the latex with hydrogen peroxide using as an external indicator a 1 percent ammoniacal aqueous solution of copper sulphate.

Example I

A latex composition was prepared having the following formulation, all parts being parts by weight:

| | Parts dry |
|---|---|
| 76:24 butadiene:styrene copolymer (as latex) | 65 |
| Potassium oleate | 0.15 |
| Natural rubber (as latex) | 35 |
| Sulphur | 2.35 |
| Mercaptobenzthiazole | 0.4 |
| Zinc diethyldithiocarbamate | 0.8 |
| 2,2'-methylene-bis(4-ethyl-6-tertiarybutylphenol) | 1.0 |
| Titanium dioxide | 20.0 |
| Monastral blue BS | 0.05 |

This latex composition having a total solids content of 60 percent and an alkalinity of 0.35 percent $NH_3$ was allowed to mature for 16 hours at 25° C.

To the latex composition a further 0.5 part dry of potassium oleate (as a 15 percent solution) was added and the latex mixing aerated in a frothing machine. After frothing, the following materials were added in dispersion form, with stirring:

| | Parts dry |
|---|---|
| Zinc oxide | 3.0 |
| Lauryl pyridinium chloride | 0.4 |
| Sodium silicofluoride | 3.5 |

Monastral blue BS is the trade name of a copper phthalocyanine and is a deep blue pigment in which the copper is complexed and stable.

Part of the foam was cast on warp-knitted continuous filament rayon in a mould ⅛ inch deep, allowed to stand for 7 minutes after gelling, cured for 15 minutes in open steam, removed from the mould, washed and dried for two hours in circulating air at 65° C.

Samples of the foam-covered rayon were immersed for ten minutes in a 3 percent hydrogen peroxide solution ammoniated to remove acidity, and then dried. Untreated and hydrogen peroxide-treated samples of the foam-covered rayon were kept in contact with the human skin, in parallel, for a total of 48 hours after which test period the untreated, control, samples were severely stained whereas the hydrogen peroxide-treated samples were not stained at all. Similar results were obtained using the copper staining test.

Samples of the foam cured in the absence of rayon, with and without hydrogen peroxide-treatment, were aged for 20 hours at 100° C. and the following tensile factors (T.F.) and percentage elongation at break (E.B. percent) figures were obtained, the tensile factors given in the table being the quotient of the tensile strength figures (in kilograms per square centimetre) divided by the corresponding densities (in grams per cubic centimetre).

| | Unaged | | Aged | |
|---|---|---|---|---|
| | T.F. | E.B., percent | T.F. | E.B., percent |
| No H₂O₂ treatment | 10.7 | 360 | 7.2 | 120 |
| H₂O₂ | 9.7 | 350 | 7.8 | 250 |

The tensile and elongation figures show clearly that, after ageing, the hydrogen peroxide treated foam had a higher tensile factor and twice the elongation at break as compared with the untreated foam.

Another sample of the foam was cured for 25 minutes in a hot oven at 130° C. and similar results were obtained. With a larger hot air oven than was available and with adequate circulation it is believed that the time of cure could be considerably reduced.

Example II

A latex composition was prepared having the following formulation, all parts being parts by weight:

| | Parts dry |
|---|---|
| 76:24 butadiene:styrene copolymer (as latex) | 65.0 |
| Natural rubber (as latex) | 35.0 |
| Potassium oleate | 1.0 |
| Sulphur | 0.2 |
| 2,2'-methylene-bis(4-ethyl-6-tertiarybutylphenol) | 1.0 |
| Titanium dioxide | 20.0 |
| Zinc diethyl dithiocarbamate | 0.5 |
| Zinc mercaptobenzthiazole | 2.0 |
| 4,4'-dithiodimorpholine | 6.0 |
| Monastral blue BS | 0.05 |

This latex composition, having a total solids content of 55 percent and an alkalinity of 0.2 percent $NH_3$ was allowed to mature for 18 hours at 25° C.

The matured latex composition was aerated in a frothing machine. After frothing, the following materials were added in dispersion form, with stirring:

| | Parts dry |
|---|---|
| Zinc oxide | 3.0 |
| Lauryl pyridinium chloride | 0.4 |
| Sodium silicofluoride | 3.5 |

The foam was cast into moulds ⅛ inch deep and allowed to stand for 7 minutes after gelling. Some samples were cured in steam at 100° C. for 10 minutes and others in an air oven at 130° C. for 20 minutes. The cured foam samples were washed. The samples were passed through rollers to remove most of the water and half of the samples from each cure were treated for 10 minutes with 3 percent hydrogen peroxide made alkaline with ammonia and excess solution removed. All the samples, together with the control samples which had not had the peroxide treatment, were dried for 16 hours at 60° C. Control and treated samples were then placed in contact with the body for a total of 48 hours when the control samples were severely stained whilst the hydrogen peroxide treated samples were not stained at all. This result was found with both steam and dry air cures.

The copper staining test gave similar results.

Example III

A quantity of 1000 parts of a 76:24 butadiene:styrene latex of 64 percent copolymer concentration was stirred and 1 part of 3 percent hydrogen peroxide added. After stirring for 10 minutes a small sample of the latex was taken out and a few drops of the dilute copper sulphate solution external indicator added. This procedure of adding 1 part of 3 percent hydrogen peroxide and stirring for 10 minutes was repeated until no discoloration was produced by the indicator when added to a removed small sample of the treated latex. In the example, 8 parts of 3 percent hydrogen peroxide were required to oxidise all the dithiocarbamate present in 1000 parts of the 64 percent latex. The treated latex was then allowed to stand for a few hours before compounding.

A latex mixing, using some of the hydrogan peroxide treated latex just described, having the following formulation, a total solids content of 60 percent and an alkalinity of 0.35 percent as $NH_3$ was prepared, and allowed to mature at 25° C. for 16 hours, parts being by weight.

| | Parts dry |
|---|---|
| 76:24 butadiene:styrene copolymer (as latex H₂O₂ treated) | 65.0 |
| Potassium oleate | 0.15 |
| Natural rubber (as latex) | 35.0 |
| Sulphur | 2.35 |
| 2,2'-methylene-bis(4-ethyl-6-tertiarybutylphenol) | 1.0 |
| Titanium dioxide | 20.0 |
| Zinc mercaptobenzthiazole | 1.5 |
| Monastral blue BS | 0.05 |

Before frothing 0.5 part of potassium stearate was added (as a 10 percent aqueous solution) and then after frothing the following additions were made in dispersion form, with continued stirring:

|  | Parts dry |
|---|---|
| Di-n-butylamine | 1.0 |
| Oleic acid | 2.2 |
| Zinc oxide | 3.0 |
| Lauryl pyridinium chloride | 0.4 |
| Sodium silicofluoride | 3.5 |

The foam alone and also foam cast on warp-knitted continuous filament rayon were cured as for the foam of Example I, and similar tests were made. There was no staining in the staining tests and the tensile factors and percentage elongation at break of the unaged and aged samples were as follows:

| Unaged || Aged ||
|---|---|---|---|
| T.F. | E.B., percent | T.F. | E.B., percent |
| 9.9 | 550 | 13.0 | 350 |

The foam rubber produced from the butadiene:styrene latex which had been treated with hydrogen peroxide gave excellent tensile and elongation at break figures even after ageing.

Having now described our invention, what we claim is:

1. In a process for the manufacture of a light colored shaped rubber article from natural or synthetic rubber using a dithiocarbamate accelerator and sulphur, the improvement which comprises contacting the cured article with a dilute aqueous solution of a peroxygenated compound until residual dithiocarbamate is substatnially oxidized without deleterious effect upon the rubber, the peroxygenated compound being selected from the group consisting of hydrogen peroxide and the alkali metal salts of perboric acid and persulphuric acid.

2. The method according to claim 1 wherein the peroxygenated compound is an alkali metal salt of perboric acid.

3. The method according to claim 1 wherein the peroxygenated compound is an alkali metal salt of persulphuric acid.

4. A method according to claim 1 wherein the cured article is in the form of foam, film or thread.

5. A method according to claim 1 wherein the article comprises white or light-coloured foam sheet of a thickness up to about 5 mm.

6. A method according to claim 1 wherein the cured rubber article is a rubber foam article and is immersed in the solution of the oxidising agent for a period of from a few seconds to ten minutes.

7. A method according to claim 6 wherein the foam rubber article is compressed to remove occluded air when the article enters the oxidising agent solution.

8. A method according to claim 1 wherein the oxidising agent is hydrogen peroxide.

9. A method according to claim 8 wherein the hydrogen peroxide solution contains from 1 to 2 percent by weight of hydrogen peroxide.

10. A method according to claim 8 wherein the solution of hydrogen peroxide is made alkaline with ammonia to a pH value of about 10.5.

11. In a process for the manufacture of a light colored shaped rubber article from a synthetic rubber latex containing residual dithiocarbamate, using sulphur and an accelerator selected from the group consisting of mercaptobenzthiazoles and polythioamines, the improvement which comprises adding a dilute solution of a peroxygenated compound selected from the group consisting of hydrogen peroxide and the alkali metal salts of perboric acid and persulphuric acid to the synthetic rubber latex in an amount sufficient to oxidize the dithiocarbamate present.

12. A method according to claim 11 wherein the dilute hydrogen peroxide solution contains up to 3 percent by weight of hydrogen peroxide.

References Cited

UNITED STATES PATENTS

| 2,138,081 | 11/1938 | Wolf | 260—2.5 |
| 2,222,783 | 11/1940 | Roberts et al. | 264—201 |
| 2,605,507 | 8/1952 | Maaskant | 264—201 |
| 2,617,840 | 11/1952 | Eckert | 260—2.5 |

FOREIGN PATENTS 884,304  12/1961  Great Britain.

GEORGE F. LESMES, *Primary Examiner.*

MURRAY TILLMAN, *Examiner.*

M. J. TULLY, *Assistant Examiner.*